United States Patent
Kore et al.

(10) Patent No.: US 11,074,137 B2
(45) Date of Patent: Jul. 27, 2021

(54) FILE EXCHANGE BY MAINTAINING COPY OF FILE SYSTEM DATA

(71) Applicant: Microsoft Technology Licensing, LLC, Redmond, WA (US)

(72) Inventors: Akshay Kalyani Kore, Hyderabad (IN); Kaustav Mukherjee, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/811,560

(22) Filed: Nov. 13, 2017

(65) Prior Publication Data
US 2019/0087277 A1   Mar. 21, 2019

(30) Foreign Application Priority Data
Sep. 20, 2017   (IN) .............................. 201741033409

(51) Int. Cl.
*G06F 7/00*   (2006.01)
*G06F 17/00*   (2019.01)
(Continued)

(52) U.S. Cl.
CPC .......... *G06F 11/1464* (2013.01); *G06F 16/13* (2019.01); *G06F 16/14* (2019.01);
(Continued)

(58) Field of Classification Search
None
See application file for complete search history.

(56) References Cited

U.S. PATENT DOCUMENTS

| 7,739,238 B2 * | 6/2010 | Strickland .......... G06Q 30/0601 707/622 |
| 8,954,400 B2 * | 2/2015 | Brown .................... H03M 7/30 707/693 |

(Continued)

FOREIGN PATENT DOCUMENTS

EP   3109813 A1   12/2016

OTHER PUBLICATIONS

Microsoft, "Indexing Service," < https://msdn.microsoft.com/en-us/library/windows/desktop/ee805985(v=vs.85).aspx>, 2 pages (accessed Aug. 28, 2017).

(Continued)

*Primary Examiner* — Tuan A Pham
(74) *Attorney, Agent, or Firm* — NovoTechIP International PLLC

(57) ABSTRACT

Techniques are described for exchanging files between users via a server environment that maintains copies of file system data from user computing devices. For example, the server environment can maintain a copy of file system data from the file system of a first computing device associated with a first user. The server environment can receive a file request from a second user that requests a file (e.g., by describing the file) from the first user whose files are backed up at the server environment. The server environment can send a request to the first user to approve the file request. After receiving approval, the server environment can send the file to the second user (e.g., as an automatic download to a computing device associated with the second user).

17 Claims, 9 Drawing Sheets

(51) Int. Cl.
*G06F 11/14* (2006.01)
*H04L 29/08* (2006.01)
*G06F 16/13* (2019.01)
*G06F 16/14* (2019.01)
*G06F 16/182* (2019.01)
*G06F 16/176* (2019.01)
*G06F 21/60* (2013.01)
*G06F 21/62* (2013.01)

(52) U.S. Cl.
CPC .......... *G06F 16/148* (2019.01); *G06F 16/176* (2019.01); *G06F 16/183* (2019.01); *G06F 21/606* (2013.01); *H04L 67/06* (2013.01); *G06F 21/6218* (2013.01); *G06F 2201/80* (2013.01); *G06F 2221/2141* (2013.01); *H04L 67/1095* (2013.01)

(56) References Cited

U.S. PATENT DOCUMENTS

| | | | | |
|---|---|---|---|---|
| 2003/0028639 | A1* | 2/2003 | Yamamoto | H04L 63/0442 709/225 |
| 2005/0086254 | A1* | 4/2005 | Zou | G06F 16/137 |
| 2005/0086298 | A1* | 4/2005 | Campbell | G06Q 30/04 709/203 |
| 2006/0206486 | A1* | 9/2006 | Strickland | H04L 67/104 |
| 2008/0313158 | A1* | 12/2008 | Lin | G06F 16/164 |
| 2009/0054092 | A1* | 2/2009 | Stonefield | H04L 51/24 455/466 |
| 2014/0201154 | A1* | 7/2014 | Varadharajan | G06F 11/1469 707/647 |
| 2015/0304254 | A1* | 10/2015 | Arai | H04L 51/04 709/206 |
| 2016/0119266 | A1* | 4/2016 | Krishnamurthy | H04L 51/18 709/206 |

OTHER PUBLICATIONS

"International Search Report and Written Opinion Issued in PCT Application No. PCT/US18/039197", dated Oct. 19, 2018, 14 Pages.

"Office Action Issued in European Patent Application No. 18743133. 3", dated Jan. 28, 2021, 6 Pages.

* cited by examiner

FILE EXCHANGE BY MAINTAINING COPY OF FILE SYSTEM DATA

CROSS REFERENCE TO RELATED APPLICATIONS

This application claims priority from Application No. 201741033409, filed in India on Sep. 20, 2017, which is hereby incorporated by reference herein.

BACKGROUND

The number of files stored by users on their computing devices is continually increasing. While a user may have easy access to the user's own files, obtaining access to the files of other users can be difficult.

For example, a user may want to obtain a particular file from the user's friend. A common approach can be for the user to ask the user's friend (e.g., in person, over the phone, or in a text message) to send the file. However, this approach suffers from a number of problems. For example, the friend may not be at his computer and thus the user may have to wait until the friend is at his computer, locates the request, and acts on it. In addition, the friend may forget to send the file or the friend may have difficulty locating the file on his computing device. Even if the friend is able to locate the desired file, he may have difficulty sending the file (e.g., he may not know how to attach the file to an email message).

Therefore, there exists ample opportunity for improvement in technologies related to exchanging files.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for exchanging files between users via a server environment that maintains copies of file system data from user computing devices. For example, the server environment can maintain a copy of file system data from the file system of a first computing device associated with a first user. The server environment can receive a file request from a second user that requests a file (e.g., by describing the file) from the first user whose files are backed up at the server environment. The server environment can send a request to the first user to approve the file request. After receiving approval, the server environment can send the file to the second user (e.g., as an automatic download to a computing device associated with the second user).

For example, a method can be provided for exchanging files between computing devices using a server environment. The method comprises maintaining a copy of file system data, comprising files and index information, from a file system of a first computing device associated with a first user, receiving a file request from a second user that comprises an indication of the first user and a description, identifying a matching file based at least in part on the index information, sending a request to the first user to approve sending the identified file to the second user, and based at least in part on receiving approval from the first user, automatically downloading the approved file from the copy of the file system data to a second computing device associated with the second user.

As another example, a method can be provided for approving file requests. The method comprises sending, to a server environment, file system data, comprising files and index information, from a file system of a computing device, receiving a request to approve sending at least one file stored at the server environment to another user, presenting, to a user of the computing device, the request to approve sending the at least one file, receiving, from the user, approval to send the at least one file to the other user, and sending the approval to the server environment.

As described herein, a variety of other features and advantages can be incorporated into the technologies as desired.

DETAILED DESCRIPTION

Overview

Figure 1:
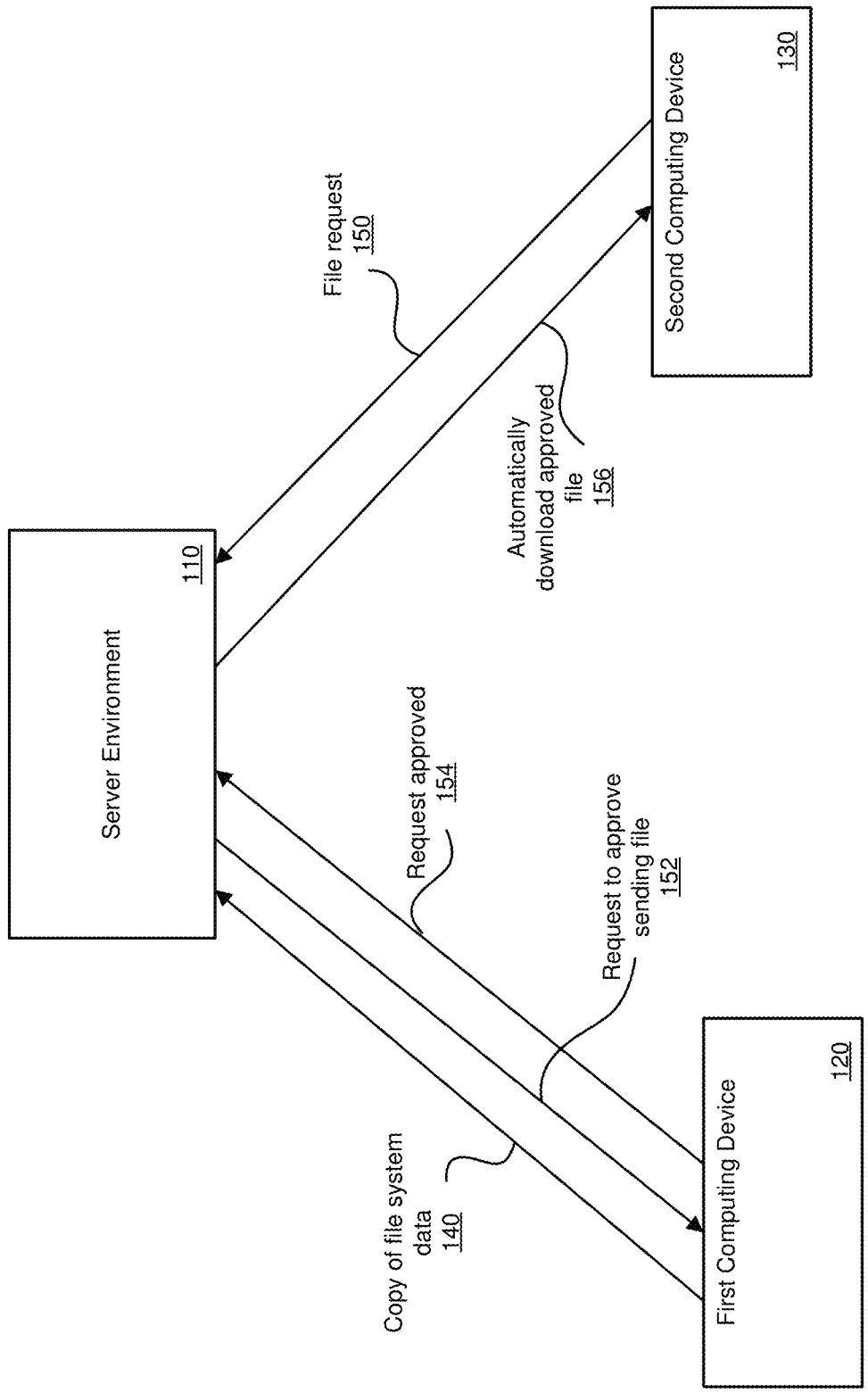
FIG. 1 is a diagram depicting an example file exchange between computing devices using a server environment.

As described herein, various technologies are provided for exchanging files between users via a server environment that maintains copies of file system data from user computing devices. For example, the server environment can maintain a copy of file system data from the file system of a first computing device associated with a first user. The server environment can receive a file request from a second user that requests a file (e.g., by describing the file) from the first user whose files are backed up at the server environment. The server environment can send a request to the first user to approve the file request. After receiving approval, the server environment can send the file to the second user (e.g., as an automatic download to a computing device associated with the second user).

With existing solutions for sharing files between users, a number of problems can occur. For example, if a user asks his friend to send him a file (e.g., a particular document, picture, video, etc.), the friend would typically have to perform a number of manual steps in order to send the file. For example, the friend may have to wait until he is at home at his desktop computer, find the file, and email it to the user. A number of issue can arise in this situation. For example, the friend could forget to send the file when he gets to his computer. The friend may not be able to locate the desired file. The friend may also not remember what file the user was asking for. The friend may also not know how to attach the file to an email message.

Using the technologies described herein, exchanging files between users can be performed more efficiently and accurately. For example, a copy of a user's file system (e.g., a portion of the file system or an entire file system) can be maintained at a server environment (e.g., as a backup, which can be automatically synchronized). The copy of the user's file system can then be used to service file requests from other users. For example, a friend of the user can send a request to the server environment requesting a file of the user that is stored at the server environment. The server environment can identify the file (e.g., from a description of the file provided by the friend), send a request to the user to approve the request, and after receiving approval transmit the requested file to the friend. In this way, instead of the friend sending a request to the user (e.g., in person, over the phone, via email, or via text message), the friend can send a file request to the server environment which can perform the work of identifying the file (or files), obtaining approval, and upon approval sending the file to the friend. This also saves time and effort on the part of the user as the user does not have to be at his computer (e.g., other than the user having to approve the request, which can be provided to the user's smartphone or other device), does not have to search his file system, and does not have to send the file to the friend.

Once the first user's file system data has been copied to the server environment, file transfers to other users can be performed by the server environment efficiently and with very little user intervention. For example, the first user only needs to perform a single operation in order to authorize a request from the server environment to send one or more identified files to another user. This saves time and computing resources. For example, the first user does not have to spend time and computing resources searching for matching files on the user's local device or generating and sending email messages with attached files.

Similarly, the second user only needs to complete a file request with a description of the file. The file request is then automatically sent to the server environment which automatically searches the first user's file system data, locates matches, obtains approval, and downloads approved files to the second user's computing device. All of the operations after the second user completes the file request can be performed without any further interaction on the part of the second user.

File Exchange Environment

In the technologies described herein, a server environment can be provided to support exchanging files between users using copies of users' file systems stored at the server environment. For example, the server environment can receive file requests, identify matching files based on the requests using locally stored copies of file system data, obtain approval for sending files, and send files upon approval.

FIG. 1 is a diagram 100 depicting an example file exchange between a first computing device 120 and a second computing device 130 using a server environment 110. The server environment can comprise various types of computer hardware and software (e.g., one or more server computers, database software, web server software, cloud computing resources, etc.). For example, the server environment 110 can be implemented as a cloud computing service providing file exchange services to various computing devices (e.g., via the Internet).

The first computing device 120 can be any type of computing device. For example, the first computing device 120 can be a desktop computer, laptop computer, tablet, smartphone, or another type of computing device. The first computing device 120 is associated with a first user.

The second computing device 130 can be any type of computing device. For example, the second computing device 130 can be a desktop computer, laptop computer, tablet, smartphone, or another type of computing device. The second computing device 130 is associated with a second user (a different user than the first user associated with the first computing device 120).

The first computing device 120 and the second computing device 130 are separate from the server environment 110 and communicate with the server environment 110 via one or more computer networks. For example, the first computing device 120 and second computing device 130 can be remote computing devices that communicate with the server environment 110 via the Internet.

As depicted at 140, the server environment 110 maintains a copy (also called a backup) of file system data from a file system of the first computing device 120. In some implementations, the file system data comprises files from the file system of the first computing device 120. A file can be any type of computer file that is stored by the file system, such as a word processing document, a video file, a picture file, or an audio file. In some implementations, the file system data also comprises index information associated with the files. The index information can comprise information derived from file attributes (e.g., filenames, file sizes, creation dates, modification dates, file paths, folder information, etc.). The index information can also comprise information derived from the content of the files. One example of index information derived from content is a text index comprising terms from text documents such as word processing documents, PDF documents, digital book formatted documents, etc. In some implementations, the index information is obtained from an index maintained by an operating system of the computing device. For example, the index information can be obtained from the Windows® Search Service.

In some implementations, a portion of the file system data from the first computing device 120 is maintained at the server environment 110. For example, file system data representing specific files and/or folders (e.g., files and/or folders storing documents likely to be requested by other users) can be maintained at the server environment 110.

In some implementations, file system data for an entire file system of the first computing device 120 is maintained at the server environment 110. For example, all of the files and index information from the file system of the first computing device 110 can be maintained at the server environment 110.

In some implementations file system data from multiple file systems is copied from the first computing device 110 and maintained at the server environment 110. For example, the first computing device 110 may have a number of storage devices or partitions each with its respective file system. File system data from one or more (or all) of the file systems of the first computing device 110 can be copied and maintained at the server environment 110.

In some implementations, the file system data is copied to the server environment 110 and maintained in sync with the first computing device 110. For example, files and/or index information that is updated at the first computing device can be copied to the server environment 110 so that the file system data is maintained in sync (e.g., so that the server environment 110 maintains a latest copy of the file system data from the first computing device 110).

As depicted at 150, a file request is sent from the second computing device 130 to the server environment 110. For example, the second user can use a user interface of the second computing device 130 to submit the file request. The user interface can be a voice user interface (e.g., provided by a voice-enabled digital personal assistant) or a graphical user interface. The file request comprises an indication of the first user (e.g., identified by username or another type of unique identifier for the first user) and a description of the file being requested. For example, the description can be in the format of a text phrase such as, "The book about learning Perl." In some implementations, the description does not include a filename. For example, the second user will typically not know the name of the first user's files being stored at the server environment 110 and therefore the second user will provide a description of the file they are looking for (e.g., a phrase or a number of keywords). In some implementations, the file request also includes an indication of a file type. For example, if the second user is requesting "The book about learning Perl," then the second user may select the file type as "book." The file type can be used, for example, by the server environment 110 to narrow down the search (e.g., by only searching the index information for files associated with the file type). For example, the "book" file type could be associated with specific file extensions, such as .pdf or .epub.

The server environment 110 uses the file request received from the second computing device 130 to identify a file (or multiple files) that matches the file request from the copy of the file system data. For example, the server environment 110 can search the index information for files that match the description (e.g., matching words from the description to words in the filenames, words in file content, and/or words in other index information such as additional meta-data). If more than one potential match is identified, the server environment can rank them based on confidence.

As depicted at 152, the server environment 110 sends a request to the first computing device 110 to approve sending the identified file to the second user (e.g., to the second computing device 130 or to another computing device associated with the second user). In some implementations, the request can indicate multiple files that were identified as matching the file request (e.g., ordered based on confidence of the match, such as from most confident to least confident).

The first computing device 120 will present the request to the first user for approval. For example, the first user can be present with a user interface (e.g., a graphical user interface, a voice user interface, etc.) requesting approval to send the identified file to the second user. If multiple files have been identified, the first user can select one (or more than one) for sending to the second user. The first user also has the option to deny the request. In some implementations, the first user can take some other action (e.g., defer the request to later in which case the first user can be prompted to complete the approval at a later time).

As depicted at 154, once the first user has approved the request to send the file, an indication of the approval is sent to the server environment 110. The server environment then sends, as depicted at 156, the approved file (or files) to the second computing device 130 from the copy of the file system data maintained at the server environment 110. For example, the server environment 110 can automatically download the approved file (or files) directly to the second computing device 130 from the copy of the file system data maintained at the server environment 110 without the second user having to take any action to receive the file (or files).

In the diagram 100, only one computing device (the first computing device 120) is associated with the first user, and the first computing device 120 serves both as the device from which the file system data is copied and the device from which file requests are approved. However, the technology also supports situations where the first user has multiple computing devices. For example, the first user may have a one device (e.g., a desktop computer) from which the file system data is backed up to the server environment 110 and another device (e.g., a smartphone or tablet) where the first user receives, and approves, file requests. For example, the server environment 110 can direct approval requests (as depicted at 152) to the computing device currently being used by the first user (e.g., if the first user is currently using his smartphone, then the server environment 110 can direct approval requests to the first user's smartphone).

In the diagram 100, only one computing device (the second computing device 130) is associated with the second user, and the second computing device 130 serves both as the device from which file request are sent and the device to which approved files are downloaded. However, the technology also supports situations where the second user has multiple computing devices. For example, the second user may have a one device (e.g., a smartphone or tablet) from which the file requests are sent (as depicted at 150) and another device (e.g., a desktop computer) which receives the approved files (as depicted at 156). For example, the server environment 110 can send the approved file to a specific computing device designated by the second user (e.g., the second user can setup a preference or configuration setting so that the server environment 110 automatically downloads approved files to the second user's desktop computer by default).

In some implementations, the server environment 110 determines meta-data from the file system data. The meta-data is then added as additional index information, which is additional to the index information received as part of the file system data. For example, the server environment 110 can determine meta-data based on filenames and/or file types (e.g., from a file named "learning pearl.epub", the server environment 110 can determine that the file is a book file and obtain meta-data such as title, author, year published, etc., which can then be added to the index information).

Figure 2:
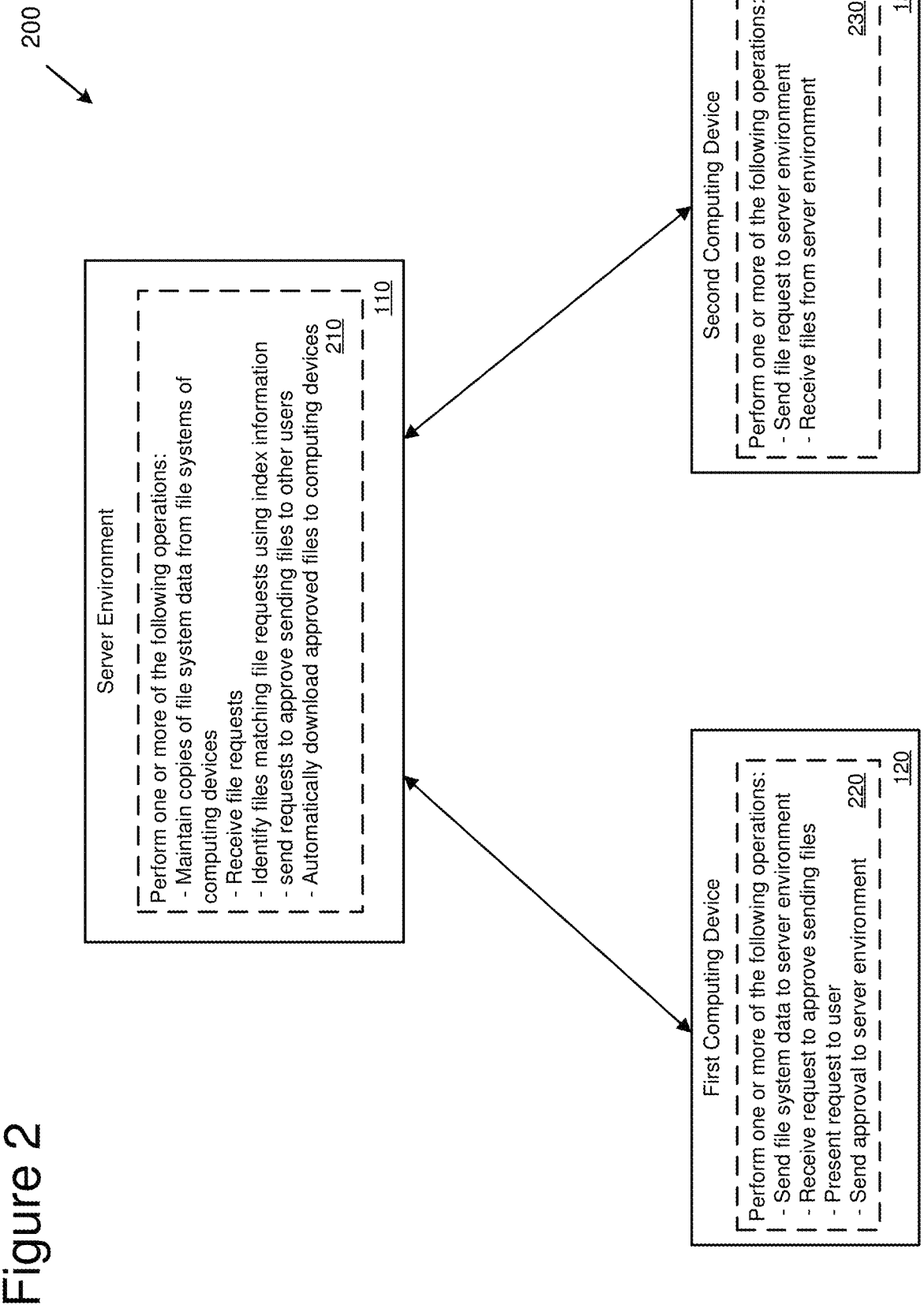
FIG. 2 is a diagram depicting an example server environment and computing devices that participate in file exchange operations using copies of file system data.

FIG. 2 is a diagram 200 depicting example operations performed by the server environment 110, the first computing device 120, and the second computing device 130. As depicted at 210, the server environment 110 can perform a variety of operations supporting automated file exchanges between the computing devices that utilize the server environment 110. For example, the server environment can maintain copies of file system data from computing devices. The file system data can comprise files and/or index information from the computing devices. For example, the server environment 110 can maintain a backup copy of file system data from the first computing device 120 (e.g., a synchronized backup of the file system data). The server environment 110 can also receive file requests (e.g., comprising user identifiers, file descriptions, and/or file types). The server environment 110 can also identify files that match file requests using index information. The server environment 110 can also send requests to computing devices to approve sending files to other users. For example, the server environment 110 can send a request to the user associated with the first computing device 120 to approve sending a file requested by the user of the second computing device 130. The server environment 110 can also automatically download approved files to computing devices. For example, the server environment 110 can automatically download an approved file to the second computing device 130 after it has been approved by the user of the first computing device 120.

As depicted at 220, the first computing device 120 can perform a variety of operations supporting automated file exchanges. For example, the first computing device 120 can send file system data to the server environment 110 (e.g., as part of an ongoing synchronized backup of file system data from a file system of the first computing device 120). The first computing device 120 can receive requests from the server environment 110 to approve file requests from other users. For example, the user of the first computing device 120 can receive a request from the server environment 110 to approve a file request that the server environment 110 received from the user of the second computing device 130. The first computing device 120 can present approval requests to the user of the first computing device 120. The first computing device 120 can also send approvals to the server environment 110.

As depicted at 230, the second computing device 130 can perform a variety of operations supporting automated file exchanges. For example, the second computing device 130 can send file requests to the server environment 110 requesting files from copies of file system data stored at the server environment 110 that are associated with other users. The second computing device 130 can also receive files from the server environment 110 (e.g., as an automatic download once the request has been approved).

If the server environment 110 is not able to match any of the files in the file system data to the file request, then the user of the first computing device 120 can be prompted to manually select a file (e.g., using a file system browser) or an indication can be presented that the file request failed.

The server environment 110 can maintain the security and privacy of the file system data. For example, the server environment 110 can restrict access to the file system data to the owner of the file system data (e.g., the user from which the file system data was copied). The server environment 110 can also restrict file requests to only specific users (e.g., those users authorized by the owner of the file system data).

The server environment 110 can also restrict access to files within the file system data based on rights. For example, digital rights management can be used to restrict sharing of certain files. For example, if the server environment 110 receives a file request, the server environment 110 can examine digital rights information associated with identified files and prevent transfer of files based upon the digital rights.

User Interfaces

In the technologies described herein, user interfaces can be provided for submitting file requests and for approving file requests. The user interfaces can comprise graphical user interfaces, voice-activated user interfaces, gesture-based user interfaces, and/or other types of user interfaces that allow users to communicate with their computing devices.

Figure 3A:
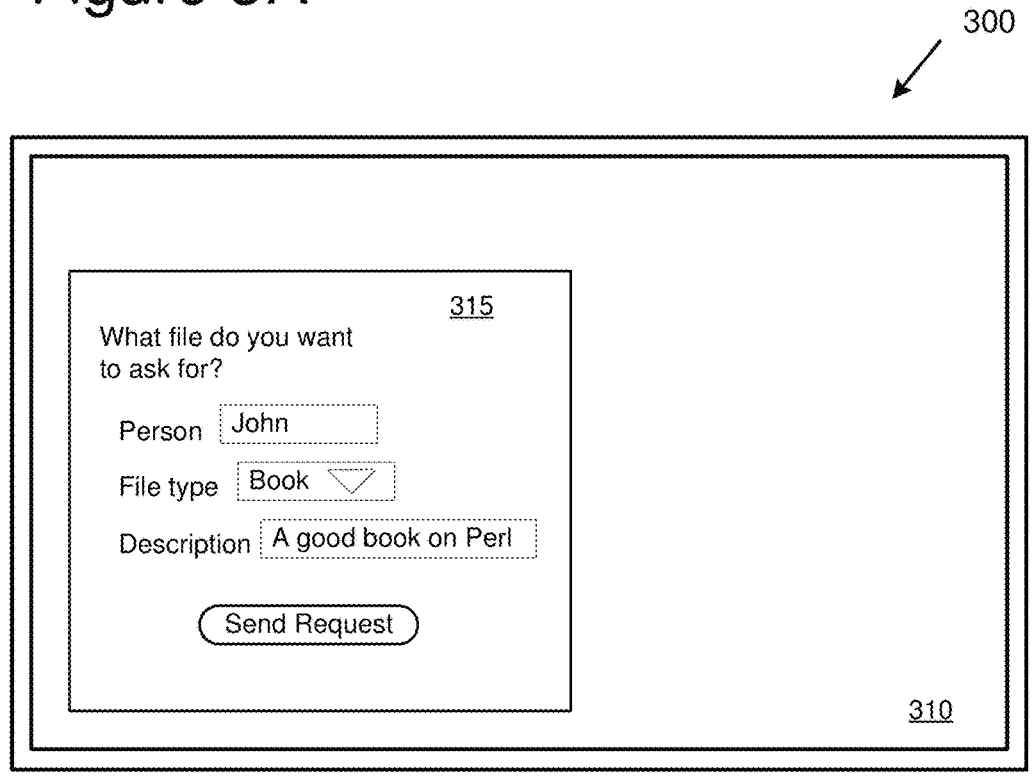
FIG. 3A is a diagram depicting an example user interface for submitting a file request to a server environment.

FIG. 3A is a diagram 300 depicting an example user interface 315 for submitting a file request to a server environment. For example, the user interface 315 can be generated by the second computing device 130 for sending a file request to the server environment 110.

The user interface 315 represents a graphical user interface displayed in a display 310 (e.g., a desktop monitor) of a computing device (e.g., a desktop computer). The user interface 315 is presented to a user of the computing device. The user interface 315 contains user a user interface element for selecting a person to which the file request is directed. Specifically, the user interface 315 contains a person field where the user of the computing device can identify another user to which the file request is directed. In this example, the other user's name is "John." For example, the user of the computing device could enter the other user's name directly (e.g., enter "John" in a fill-in field), select the other user's name from a list (e.g., from a contact or friends list), or select the other user's name in a different way (e.g., via voice input). In some implementations, the other user's name can be an alias. For example, the person "John" can be an alias that refers to a particular user account present at the server environment (e.g., an alias that refers to a unique user identifier, which could be a username, email address, or another type of user identifier). The alias can be converted to the particular user account when transmitting the file request to the server environment so that the server environment can uniquely identify the user account to which the request is directed.

The user interface 315 also contains a user interface element for selecting the type of file being requested. Specifically, a drop-down field is presented where the user can select one of a number of available file types. For example, the available file types can be book, music, video, and other. Other file types can be presented as well.

The user interface 315 also contains a user interface element for entering a description of the file being requested. For example, the description can be a text field where the user can enter the description (e.g., via a keyboard or speech recognition).

In some implementations, different elements may be present in the user interface 315. For example, in some implementations, the file type element may not be present. The user interface 315 may also contain additional user interface elements.

Figure 3B:
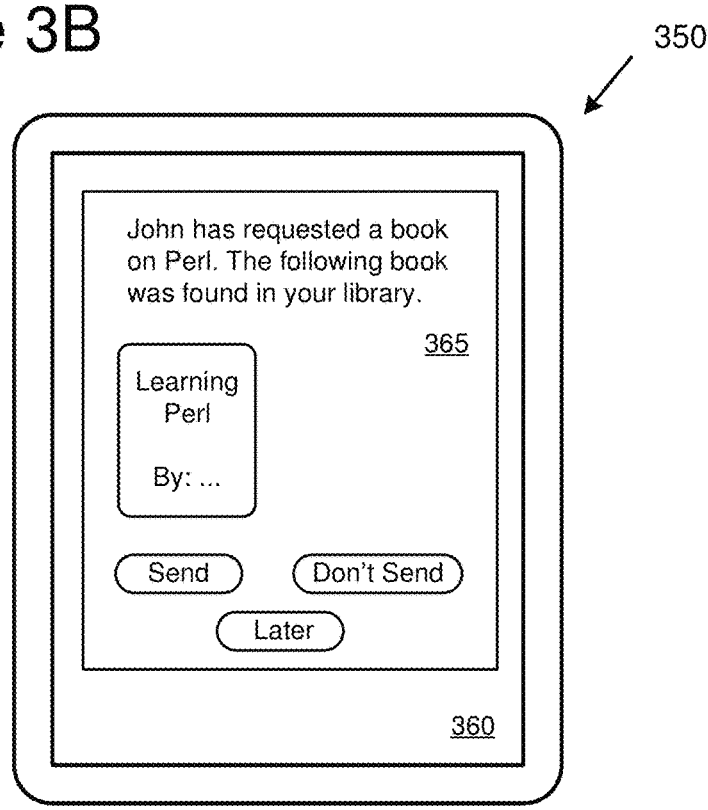
FIG. 3B is a diagram depicting an example user interface for approving a file request received from a server environment

FIG. 3B is a diagram 350 depicting an example user interface 365 for approving a file request received from a server environment. For example, the user interface 365 can be generated by the first computing device 120 after receiving a request from the server environment 110 to approve sending a file to the second computing device 130. The user interface 365 can be displayed in response to receiving a file approval request generated by the user interface 315.

The user interface 365 represents a graphical user interface displayed in a display 360 (e.g., a smartphone display) of a computing device (e.g., a smartphone). The user interface 365 is presented to a user of the computing device. The user interface 365 contains a description of the file request (e.g., information identifying the user that is requesting the file and information identifying the file, or files, that were identified as matching the request). The user interface 365 also contains an indication of the file itself (e.g., an icon identifying the specific file, such as by title, author, filename, and/or other identifying information). In this example, the user interface 365 describes that the user "John" has requested a book on Perl and an icon of the identified file (a particular book titled "Learning Perl") has been identified as matching the request.

The user interface 365 contains a number of user interface elements for the user to respond to the request to approve sending the file to the other user. In this example, there is a "send" button, a "don't send" button, and a "later" button. The "send" button will send a response to the server environment approving the request to send the file to the other user. The "don't send" button will send a response to the server environment indicating that the request has been denied (e.g., the server environment can inform the other user that the request was denied). The "later" button will delay the request until later. For example, the computing device can remind the user at a later time to respond to the approval (e.g., if the request has been pending for some time, such as a day, then the computing device can remind the user that the request is pending approval). In some implementations, the user interface may have different user interface elements for responding to the request (e.g., the "later" option may not be available).

In some implementations, the user interface 365 displays a number of possible matching files (e.g., a number of icons representing a corresponding number of books about Perl that were identified by the server environment as possible matches). In this situation, the user can select one or more of the files for sending to the other user (e.g., by clicking or otherwise selecting the icons that the user wants to approve).

While specific types of user interface elements are depicted in the user interfaces 315 and 365, other types of user interface elements can be used as well. For example, the user interface elements can be fill-in fields, drop-down fields, check boxes, buttons, etc.

The user interfaces 315 and 365 are depicted as graphical user interfaces. However, other types of user interfaces can be used in addition to, or instead of, a graphical user interface. For example, a voice-activated user interface (e.g., via a digital personal assistant) can be used.

Methods for Transferring Files

In any of the examples herein, methods can be provided for transferring files using a server environment that maintains a copy of file system data from other computing devices (e.g., external computing devices that communicate with the server environment via a computer network, such as the Internet).

Figure 4:
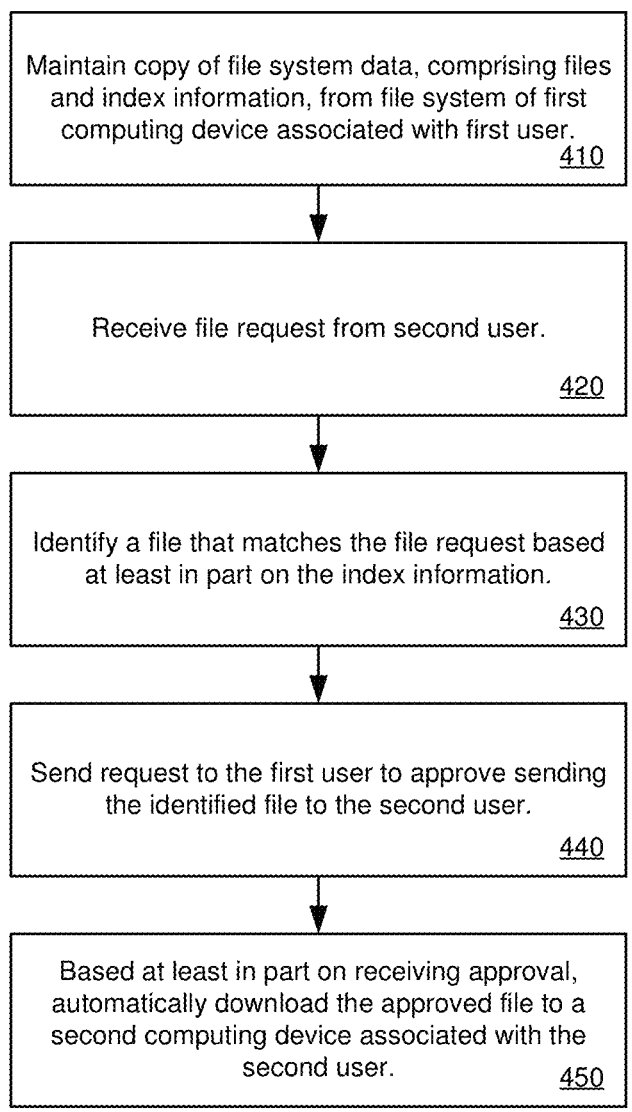
FIG. 4 is a flowchart of an example method for exchanging files between computing devices using a server environment.

FIG. 4 is a flowchart of an example method 400 for exchanging files between computing devices using a server environment. For example, the example method 400 can be performed by the server environment 110.

At 410, a copy of file system data from a file system of a first computing device is maintained at a server environment. The first computing device is associated with a first user (e.g., the first computing device can be the first user's desktop computer, laptop computer, tablet computer, or another type of computing device). The file system data comprises files and index information.

At 420, a file request is received from a second user (a different user than the first user). The file request comprises an indication of the first user and a description. The indication of the first user can be a user identifier (e.g., username, email address, or another type of identifier that the server environment can use to identify the first user). The description describes the file being requested (e.g., a number of words from which terms can be extracted and used to identify a matching file).

At 430, a file that matches the request is identified based at least in part on the index information. The identified file is from the copy of the file system data maintained by the server environment. The file can be identified using various types of index information. For example, the index information can comprise information derived from file attributes and/or content of the files. The index information can also comprise meta-data index information that is determined by the server environment. In some implementations, the index information comprises index information obtained from the first computing device in addition to index information determined by the server environment. In some implementations, more than one matching file is identified (e.g., ordered by confidence of the match)

At 440, a request is sent to the first user to approve sending the identified file to the second user. For example, the approval request can comprise a message (e.g., identifying the second user and describing the requested file) and an indication of the identified file (e.g., title, icon, filename, and/or other text or graphical identifying information). In some implementations, the request indicates more than one identified file (e.g., from which the first user can select one or more of them).

At 450, after approval has been received from the first user, the approved file is automatically downloaded from the server environment (using the copy of the file system data) to a second computing device associated with the second user. In some implementations, multiple approved files can be automatically downloaded.

Figure 5:
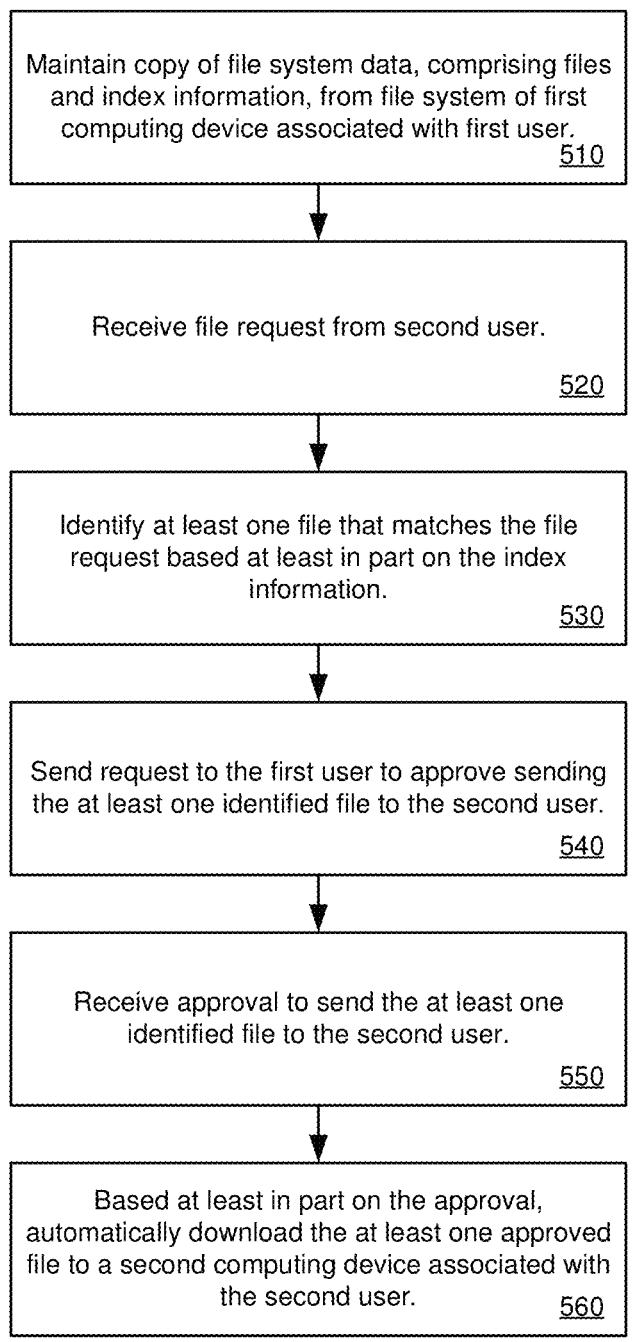
FIG. 5 is a flowchart of an example method for exchanging files between computing devices using a server environment.

FIG. 5 is a flowchart of an example method 500 for exchanging files between computing devices using a server environment. For example, the example method 500 can be performed by the server environment 110.

At 510, a copy of file system data from a file system of a first computing device is maintained at a server environment. The first computing device is associated with a first user (e.g., the first computing device can be the first user's desktop computer, laptop computer, tablet computer, or another type of computing device). The file system data comprises files and index information.

At 520, a file request is received from a second user (a different user than the first user). The file request comprises an indication of the first user and a description. The indication of the first user can be a user identifier (e.g., username, email address, or another type of identifier that the server environment can use to identify the first user). The description describes the file being requested (e.g., a number of words from which terms can be extracted and used to identify matching files).

At 530, at least one file that matches the request is identified from the copy of the file system data based at least in part on the index information. The at least one file can be identified using various types of index information. For example, the index information can comprise information derived from file attributes and/or content of the files. The index information can also comprise meta-data index information that is determined by the server environment. In some implementations, the index information comprises index information obtained from the first computing device in addition to index information determined by the server environment.

At 540, a request is sent to the first user to approve sending the at least one identified file to the second user. For example, the approval request can comprise a message (e.g., identifying the second user and describing the requested file) and an indication of the at least one identified file (e.g., title, icon, filename and/or other text or graphical identifying information).

At 550, approval is received from the first user to send the at least one identified file to the second user. At 560, after the approval has been received, the at least one approved file is automatically downloaded from the server environment (using the copy of the file system data) to a second computing device associated with the second user.

Figure 6:
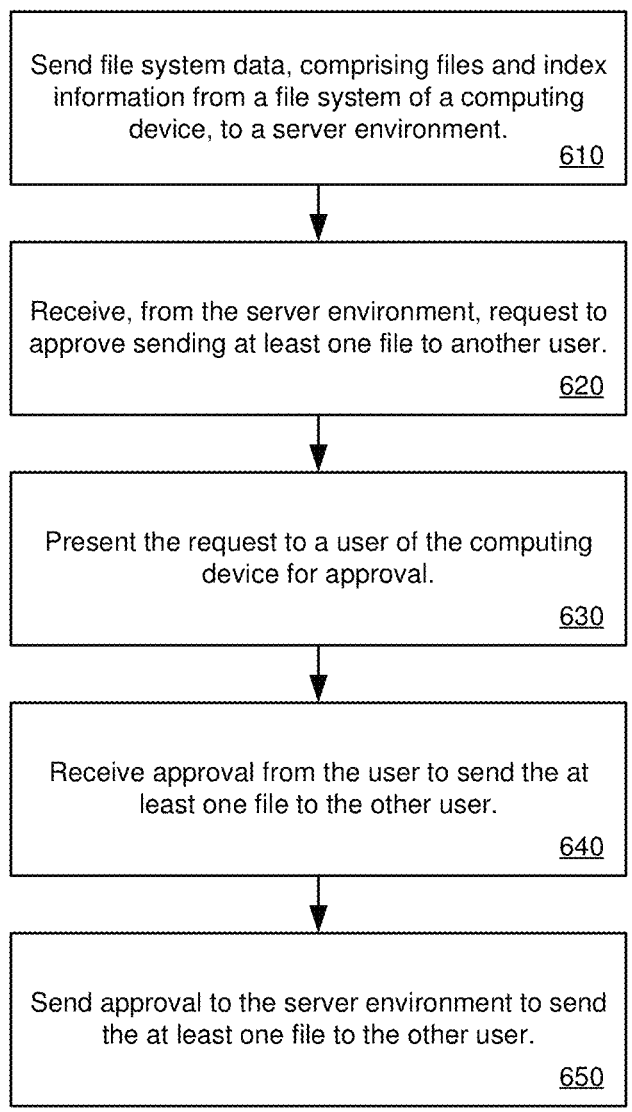
FIG. 6 is a flowchart of an example method for approving requests to send files to other users via a copy of file system data maintained at a server environment.

FIG. 6 is a flowchart of an example method 600 for approving requests to send files to other users via a copy of file system data maintained at a server environment. For example, the example method 600 can be performed by the first computing device 120.

At 610, file system data is sent from a computing device to the server environment. The file system data comprises files and index information from a file system of the computing device. The file system data can be stored at the server environment as a backup.

At 620, a request is received from the server environment to approve sending at least one of the files stored (as part of the file system data) at the server environment to another user. The request can comprise an indication of the other user as well as an indication of the file (e.g., title, icon, filename and/or other text or graphical identifying information).

At 630, the request is presented to the user of the computing device for approval. For example, the request can be presented via a graphical user interface, such as depicted at 365.

At 640, approval is received from the user to send the at least one file to the other user. For example, the user can select a "send" or "approve" button displayed in a user interface.

At 650, approval is sent to the server environment to send the at least one file to the other user. After the server environment receives the approval, the at least one file can be automatically downloaded directly from the server environment (using the copy of the file system data) to a computing device associated with the other user.

Example Implementations for Automated File Transfers

In some implementations, the server environment determines meta-data from the file system data received from the computing device. The meta-data can then be added as additional index information, which is additional to the index information received as part of the file system data.

In some implementations, meta-data is determined from filenames. For example, a filename of "Witness.For.The.Prosecution(1957).mp4" can be analyzed by the server environment and determined to be a filename referring to a movie. Meta-data for the specific movie can be obtained (e.g., from an external database or search engine), and the meta-data can be added as additional index information associated with the file (e.g., added to a meta-data index or a new node containing the meta-data that is added to an existing index information data structure). Below is one example of meta-data index information that can be obtained for the example movie file.

```
{
    "Movie": "Witness for the Prosecution",
    "Year": "1957",
    "Genres": ["Crime", "Courtroom"],
    "Actors": ["Marlene Dietrich", "Charles Laughton"]
}
```

As another example, meta-data can be obtained based on the following filename "Learning.Perl.epub". Below is one example of meta-data index information that can be obtained for this example book file.

```
{
    "Book": "Learning Perl",
    "Year": "1993",
    "Genres": ["Programming", "Perl"],
    "Authors": ["Randal Schwartz"]
}
```

In some implementations, the file exchange technology described herein is performed, at least in part, by voice input (e.g., using a voice-enabled digital personal assistant). For example, user can request, using voice input, a file from the user's friend (e.g., "Ask John to send me a good book on Perl"). The user's computing device can process the user's voice input to identify the friend's name (e.g., to identify the friend's username from the alias "John") and generate a file request (e.g., comprising the friend's username and a description of the file, which could be "a good book on Perl"). For example, the processing can be performed, at least in part, using natural language processing. The user's computing device can send the file request to a server environment.

Continuing the example, the server environment can identify the specific book on Perl from the friend's file system data (e.g., searching for the term "Perl" in index information from the file system data, which could locate "Perl" in index information derived from file attributes such as in a filename, from content of the files such as in a header of a text document, and/or from meta-data such as in a title field). The server environment can send a request to the friend to approve sending the identified file to the user. For example, the friend's computing device can present the approval request via a digital personal assistant and the friend can indicate approval (e.g., say, "please send the file"). The friend's computing device can send the approval to the server environment which can in turn send the file to the user.

In some implementations, the files matching the file request are identified by the server environment using a file type that is included in the file request. For example, the files stored at the server environment can be filtered based on the file type (e.g., just search for matches within video files).

In some implementations, the server environment searches multiple types of index information in order to identify matching files. For example, if the file request is for "a good book on Perl," then the server environment can identify (e.g., using natural language processing) that the relevant terms are "book" (indicating that the search can be narrowed to file formats or extensions that are associated with books, such as text documents, PDF documents, and digital book formats) and "Perl" (indicating a title or description of the book). The server environment can search for the term "Perl" in various indexes, such as indexes of filenames, indexes of file content, and/or indexes of meta-data. A match for the term "Perl" may be found in one or more of the indexes. For example, the term could be found in a filename (e.g., "Learning.Perl.epub"), in file content (e.g., content index for the "Learning.Perl.epub" file that indicates "Perl" has numerous occurrences in the file), and/or in meta-data (e.g., that "Perl" occurs in the title and description fields of the meta-data associated with the "Learning.Perl.epub" file). The confidence of the match can be influenced by the index within which the match is found. For example, filename index matches can be preferred over content index matches. As another example, a match in the title of a meta-data index can be preferred over a match in the description of a meta-data index. The confidence of the match can also be influenced by which indexes a match is found within. For example, if a match is only found in one type of index information (e.g., only in the filename index, but not in the content or meta-data index), then the match can be ranked as relatively low confidence. However, if a match is found in two types of index information (e.g., in both the content index and the meta-data index, but not the filename index), then the match can be ranked as relatively high confidence. When multiple matches are found, they can be ordered based on their confidence. For example, a first file for which matches are found in both filename and content index information can be ranked higher than a second file for which a match is found in only the filename index information.

In some implementations, the server environment generates a one-time download URL that allows the computing device to download an approved file (or files). For example, the computing device can poll the server environment and check for pending file downloads (e.g., to obtain the one-time download URL to automatically download the file to a folder, such as a downloads folder, on the computing device). The server environment can also contact the computing device directly to initiate the download. Once the file has been downloaded, a message can be communicated to the user that the file has been downloaded (e.g., a notification message that is displayed on the user's desktop or smartphone).

Example Embodiments and Alternatives

Any of the technologies and features described herein can be used separately or in combination. For example components described in one embodiment can be included in other embodiments and vice versa. The following paragraphs are non-limiting examples of such combinations. In addition, the example embodiments can be implemented in the context of computing devices, methods, and/or computer-readable storage media.

In a first example embodiment, a server environment comprises a processing unit and memory, and the server environment is programmed, via computer-executable instructions, to perform operations comprising: maintaining a copy of file system data from a file system of a first computing device, the first computing device associated with a first user, wherein the file system data comprises: files from the file system; and index information associated with the files; receiving, from a second user, a file request that comprises an indication of the first user and a description; identifying, based at least in part on the index information, a file, of the files from the file system, that matches the file request; sending, to the first user, a request to approve sending the identified file to the second user; and based at least in part on receiving approval from the first user, automatically downloading the approved file from the copy of the file system data to a second computing device associated with the second user. In some examples, the index information comprises: information derived from filenames of the files from the file system; and information derived from content of the files from the file system. In some examples, the operations also comprise: determining meta-data associated with the files from the file system, wherein at least some of the meta-data is determined based on filenames and file types of the files; and adding the determined meta-data as additional index information associated with the files. In some examples, identifying the file comprises: matching terms from the description with terms in the filename index information, content index information, and meta-data index information; and ordering matching files based at least in part on whether a match is found in filename index information, content index information, or meta-data index information. In some examples, identifying the file comprises: matching terms from the description with terms in the index information; and wherein the identified file is a closest match among the files from the file system. In some examples, the copy of the file system data is maintained as a backup of an entire file system of the first computing device. In some examples, the operations also comprise: identifying one or more additional files that match the file request; wherein the request to approve sending the identified file comprises indications of the identified file and the one or more additional identified files. In some examples, the file request received form the second user does not include a filename. In some examples, the server environment implements a file exchange service that communicates, via the Internet, with the first and second computing devices In a second example embodiment, which can be implemented independently or in combination with some or all of the first embodiment, a method, implemented by a server environment comprising a processing unit and memory, comprises: maintaining a copy of file system data from a file system of a first computing device, the first computing device associated with a first user, wherein the file system data comprises: files from the file system; and index information associated with the files; receiving, from a second user, a file request that comprises an indication of the first user and a description of a file, wherein the description does not include a filename; identifying, based at least in part on the index information, at least one of the files that matches the file request, wherein the identifying comprises matching terms from the description with terms in the index information; sending, to the first user, a request to approve sending the at least one identified file to the second user; receiving, from the first user, approval to send the at least one identified file to the second user; and based at least in part upon the approval, automatically downloading the at least one approved file from the copy of the file system data to a second computing device associated with the second user; wherein the at least one file is identified and automatically downloaded to the second computing device without user intervention by the second user. In some examples, the index information comprises: information derived from file attributes of the files from the file system; and information derived from content of the files from the file system. In some examples, the method also comprises: determining meta-data associated with the files from the file system, wherein at least some of the meta-data is determined based on filenames and file types of the files; and adding the determined meta-data as additional index information associated with the files. In some examples, the file request further comprises a file type.

In a third example embodiment, which can be implemented independently or in combination with some or all of the first and/or second embodiments, operations are performed by a computing device, the operations comprising: sending, to a server environment, file system data from a file system of the computing device, wherein the file system data is stored at the server environment as a copy, and wherein the file system data comprises: files from the file system; and index information associated with the files; receiving, from the server environment, a request to approve sending at least one file stored at the server environment to another user, wherein the request comprises an indication of the at least one file and an indication of the other user; presenting, to a user of the computing device, the request to approve sending the at least one file to the other user; receiving, from the user of the computing device, approval to send the at least one file to the other user; and sending, to the server environment, the approval to send the at least one file to the other user; wherein the at least one file is automatically downloaded directly from the server environment, using the copy of file system data stored at the server environment, to another computing device associated with the other user. In some examples, the request to approve sending the at least one file to the other user is presented to the user of the computing device via a digital voice assistant of the computing device. In some examples, the user of the computing device performs a single action to authorize automatically downloading the at least one file to the other user's computing device without user interaction on the part of the other user. In some examples, the index information comprises: information derived from file attributes of the files from the file system; and information derived from content of the files from the file system. In some examples, the file attributes comprise filenames and file types. In some examples, the file system data is an entire file system of the computing device. In some examples, presenting the request to approve sending the at least one file to the other user comprises: presenting a plurality of files for selection by the user of the computing device for approval for sending to the other user; wherein the at least one file is selected for approval from the presented plurality of files.

Computing Systems

Figure 7:
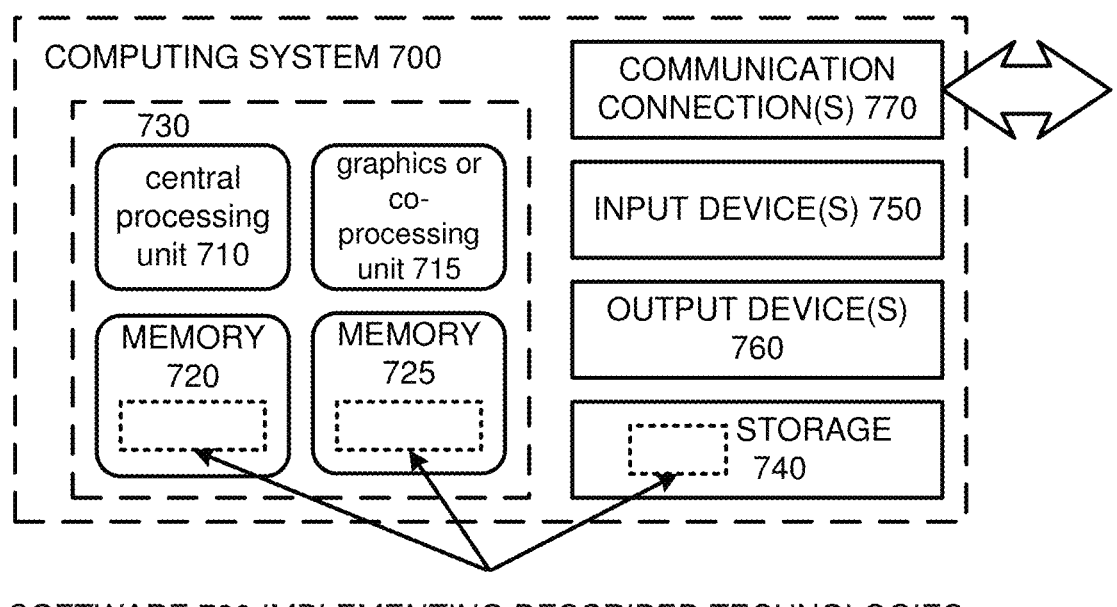
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
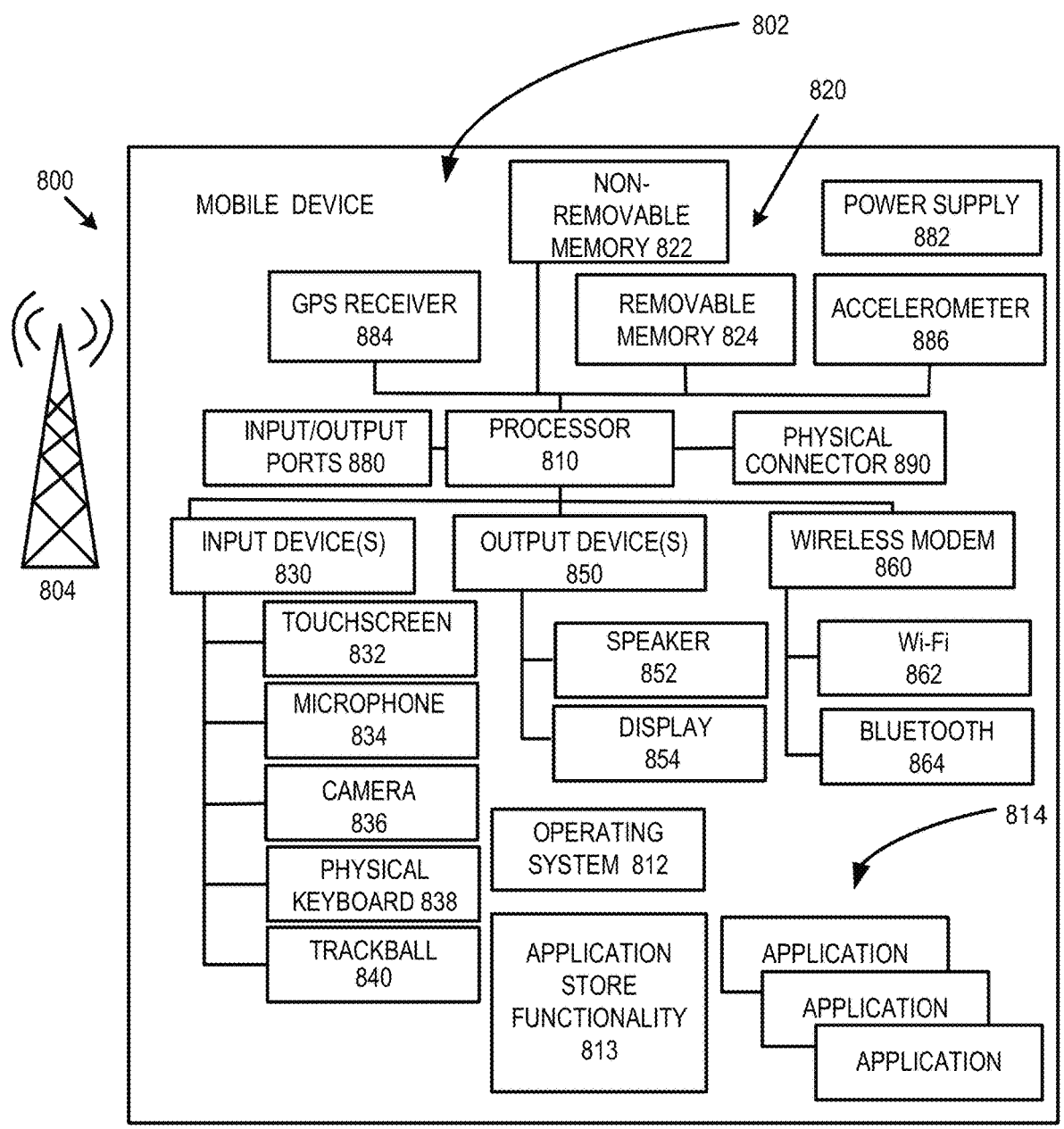
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
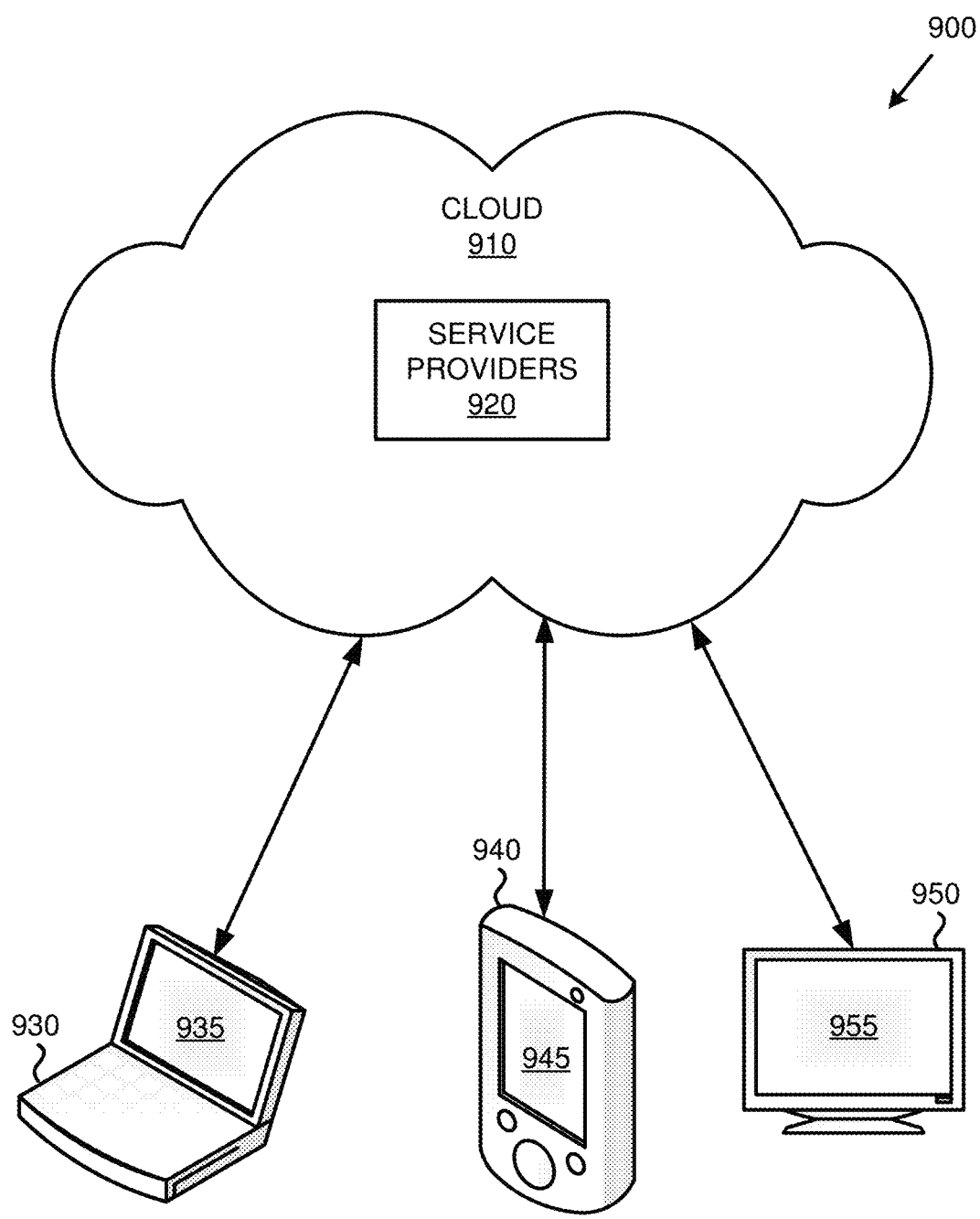
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections, such as 770, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A server environment comprising:
 a processing unit; and
 a memory;
 the server environment programmed, via computer-executable instructions stored in the memory and executed by the processing unit, to perform operations comprising:
  maintaining a copy of file system data from a file system of a first computing device, the first computing device associated with a first user, wherein the file system data comprises:
   files from the file system; and
   index information associated with the files, the index information including filename information derived from filenames of the files and content information derived from content of the files;
  determining metadata associated with the files based at least in part on the filenames and file types of the files;
  adding the metadata to the index information as additional index information;
  receiving, from a second user, a file request to conduct a search of the file system of the first computing device associated with the first user for a file that corresponds to a description included with the file request, wherein the description does not include a filename;
identifying, based at least in part on the index information and the additional index information, a file from among the files from the file system that corresponds to the description included with the file request by matching terms from the description with terms in the filename information, the content information, and the metadata;
sending, to the first user, a request to approve sending the identified file to the second user; and
based at least in part on receiving approval from the first user, automatically downloading the approved file from the copy of the file system data to a second computing device associated with the second user.

2. The server environment of claim 1, wherein identifying the file comprises:
ordering matching files based at least in part on whether a match is found in filename index information, content index information, or meta-data index information.

3. The server environment of claim 1, wherein identifying the file comprises:
matching terms from the description with terms in the index information,
wherein the identified file is a closest match among the files from the file system.

4. The server environment of claim 1, wherein the copy of the file system data is maintained as a backup of an entire file system of the first computing device.

5. The server environment of claim 1, wherein the memory further stores instructions that when executed by the processing unit cause the processing unit to perform operations of:
identifying one or more additional files that match the file request,
wherein the request to approve sending the identified file comprises indications of the identified file and the one or more additional identified files.

6. The server environment of claim 1, wherein the file request received from the second user does not include a filename.

7. The server environment of claim 1, wherein the server environment implements a file exchange service that communicates, via Internet, with the first and second computing devices.

8. A method, implemented by a server environment comprising a processing unit and memory, the method comprising:
maintaining a copy of file system data from a file system of a first computing device, the first computing device associated with a first user, wherein the file system data comprises:
files from the file system; and
index information associated with the files, the index information including filename information derived from filenames of the files and content information derived from content of the files;
determining metadata associated with the files based at least in part on the filenames and file types of the files;
adding the metadata to the index information as additional index information;
receiving, from a second user, a file request to conduct a search of the file system of the first computing device associated with the first user for a file that corresponds to a description included with the file request, wherein the description does not include a filename;
identifying, based at least in part on the index information and the additional index information, at least one file from among the files of the file system that corresponds to the description included with the file request by matching terms from the description with terms in the filename information, the content information, and the metadata, wherein the identifying comprises matching terms from the description with terms in the index information;
sending, to the first user, a request to approve sending the at least one identified file to the second user;
receiving, from the first user, approval to send the at least one identified file to the second user; and
based at least in part upon the approval, automatically downloading the at least one approved file from the copy of the file system data to a second computing device associated with the second user,
wherein the at least one file is identified and automatically downloaded to the second computing device without user intervention by the second user.

9. The method of claim 8, wherein the index information comprises:
information derived from file attributes of the files from the file system, and
information derived from content of the files from the file system.

10. The method of claim 8, wherein the file request further comprises a file type.

11. A computer-readable storage medium on which are stored instructions that, when executed, cause a processor of a programmable device to perform functions of:
maintaining a copy of file system data from a file system of a first computing device, the first computing device associated with a first user, wherein the file system data comprises:
files from the file system; and
index information associated with the files, the index information including filename information derived from filenames of the files and content information derived from content of the files;
determining metadata associated with the files based at least in part on the filenames and file types of the files information;
adding the metadata to the index information as additional index information;
receiving, from a second user, a file request to conduct a search of the file system of the first computing device associated with the first user for a file that corresponds to a description included with the file request, wherein the description does not include a filename;
identifying, based at least in part on the index information and the additional index information, a file from among the files from the file system that corresponds to the description included with the file request by matching terms from the description with terms in the filename information, the content information, and the metadata;
sending, to the first user, a request to approve sending the identified file to the second user; and
based at least in part on receiving approval from the first user, automatically downloading the approved file from the copy of the file system data to a second computing device associated with the second user.

12. The computer-readable storage medium of claim 11, wherein identifying the file comprises:
ordering matching files based at least in part on whether a match is found in filename index information, content index information, or meta-data index information.

13. The computer-readable storage medium of claim 11, wherein identifying the file comprises:
    matching terms from the description with terms in the index information,
    wherein the identified file is a closest match among the files from the file system.

14. The computer-readable storage medium of claim 11, wherein the copy of the file system data is maintained as a backup of an entire file system of the first computing device.

15. The computer-readable storage medium of claim 11, wherein the computer-readable storage medium further stores instructions that, when executed, cause the processor of the programmable device to perform a function of:
    identifying one or more additional files that match the file request,
    wherein the request to approve sending the identified file comprises indications of the identified file and the one or more additional identified files.

16. The computer-readable storage medium environment of claim 11, wherein the file request received from the second user does not include a filename.

17. The computer-readable storage medium of claim 11, wherein the programmable device implements a file exchange service that communicates, via an Internet connection, with the first and second computing devices.

\* \* \* \* \*